United States Patent [19]

Inui et al.

[11] Patent Number: 4,543,846
[45] Date of Patent: Oct. 1, 1985

[54] INTERLOCKING CONSTRUCTION IN TRANSMISSION MANIPULATION DEVICE FOR MANUAL TRANSMISSION

[75] Inventors: Masaki Inui; Yasuyoshi Yasui, both of Toyota, Japan

[73] Assignee: Toyota Jidosha Kabushiki Kaisha, Japan

[21] Appl. No.: 454,012

[22] Filed: Dec. 28, 1982

Related U.S. Application Data

[62] Division of Ser. No. 397,442, Jul. 12, 1982, Pat. No. 4,494,419.

[30] Foreign Application Priority Data

Aug. 20, 1981 [JP] Japan .................................. 56-131946
Sep. 1, 1981 [JP] Japan .................................. 56-138082

[51] Int. Cl.⁴ ........................... G05G 5/10; G05G 9/18
[52] U.S. Cl. ..................................... 74/477; 74/473 R
[58] Field of Search ..................... 74/473 R, 477, 475

[56] References Cited

U.S. PATENT DOCUMENTS 4,377,951 3/1983 Magg et al. ............................ 74/477

FOREIGN PATENT DOCUMENTS 1065364 4/1967 United Kingdom .................. 74/477

*Primary Examiner*—Allan D. Herrmann
*Attorney, Agent, or Firm*—Parkhurst & Oliff

[57] ABSTRACT

Disclosed is an interlocking construction for manual transmission manipulation device. The interlocking construction comprises an interlocking plate rotatably provided on a shift and select lever shaft but prevented from rotating with respect to a case, so that when a second projection of the lever shaft engages an engaging portion of a first shift head, the interlocking plate is engageable with the engaging portions of the shift forks on a first fork shaft which are not engaged by a first projection, as well as with the engaging portion of a second shift head, whereas, when the second projection does not engage with the first shift head, the interlocking plate is engageable with the engaging portions of all shift forks on the first fork shaft, as well as the engaging portion of the first shift head.

3 Claims, 7 Drawing Figures

INTERLOCKING CONSTRUCTION IN TRANSMISSION MANIPULATION DEVICE FOR MANUAL TRANSMISSION

This is a division of Ser. No. 397,442, filed July 12, 1982, now U.S. Pat. No. 4,494,419.

BACKGROUND OF THE INVENTION

The present invention relates to an interlocking construction in a transmission manipulation device for manual transmission and, more particularly, to an interlocking construction which is intended for holding immovable shift forks which are not to be shifted in the shifting operation of the transmission.

A typical conventional transmission manipulation device has a plurality of shift forks mounted axially movably on a fork shaft which in turn is fixed to the transmission case, and a shift and select lever shaft which is mounted in the transmission case at a right angle to the fork shaft. In the manipulation of the transmission, the selecting operation is effected by axial movement of the shift and select lever shaft to bring the engaging portion thereof into engagement with one of the shift forks, while the shifting operation is effected by the movement of the shift fork on the fork shaft upon rotation of the lever shaft. The interlocking construction in this type of transmission manipulation device is required only to hold immovable the shift forks which are not to be shifted in the shifting operation of the transmission shaft. This interlocking construction, however, cannot be applied to the transmission manipulation device to which the present invention pertains, as will be understood from the following description.

The manipulation device for transmission to which the present invention pertains has a first fork shaft and a second fork shaft parallel to each other and axially movably carried by the case of the transmission. The first fork shaft carries a plurality of shift forks axially movably and rotatably. The shift forks have engaging portions aligned in the direction perpendicular to the fork shaft. The transmission case carries also a shift and select lever shaft perpendicular to the fork shafts for axial movement and rotation. The lever shaft is provided with a first projection capable of selectively engaging the engaging portion of one of the shift forks. A first shift head having an engaging portion, which is in a side-by-side relation to the engaging portion of the shift forks, is fixed to the first fork shaft. The lever shaft is provided with a second projection capable of engaging the engaging portion of the first shift head only when the first retaining portion is in engagement with the engaging portion of one of the shift forks on the first fork shaft. At the same time, a single shift fork is fixed to the second fork shaft. Also, a second shift head having an engaging portion in a side-by-side relation to the aforementioned engaging portions is fixed to the second fork shaft. The first projection of the lever shaft is selectively engageable with this engaging portion.

Therefore, when the fork shaft, particularly the second fork shaft, is shifted, it is necessary to hold immovable not only the shift forks on the first fork shaft but also the first fork shaft itself. This can hardly be achieved by the conventional interlocking construction explained before.

SUMMARY OF THE INVENTION

Accordingly, an object of the invention is to provide an interlocking construction in a transmission manipulation device, which is improved to perform the interlocking operation reasonable in response to the selecting operation of the shift and select lever shaft, even in the aforesaid transmission manipulation device to which the conventional interlocking construction cannot be applied.

To this end, according to the invention, there is provided an interlocking construction comprising an interlocking plate rotatably provided on the lever shaft but being prevented from rotating with respect to the case, wherein, when the second projection is engaged by the engaging portion of the first shift head, the interlocking plate is engageable with the engaging portions of the shift forks on the first fork shaft which are not engaged by the first projection, as well as with the engaging portion of the second shift head, whereas, when the second projection does not engage with the first shift head, the interlocking plate is engageable with the engaging portions of all shift forks on the first fork shaft, as well as the engaging portion of the first shift head.

The above and other objects, features and advantages of the invention will become apparent from the following description of the preferred embodiments taken in conjunction with the accompanying drawings.

BRIEF DESCRIPTION OF THE DRAWINGS

FIGS. 4A, 4B and 4C are enlarged views of the connection between the lever shaft and the fork shaft, wherein FIG. 4A shows the state in which the neutral position is selected, FIG. 4B shows the state in which the first or second speed gear is selected, and FIG. 4C shows the state in which the fifth speed or the reverse gear is selected, respectively.

DESCRIPTION OF THE PREFERRED EMBODIMENTS

Figure 1:
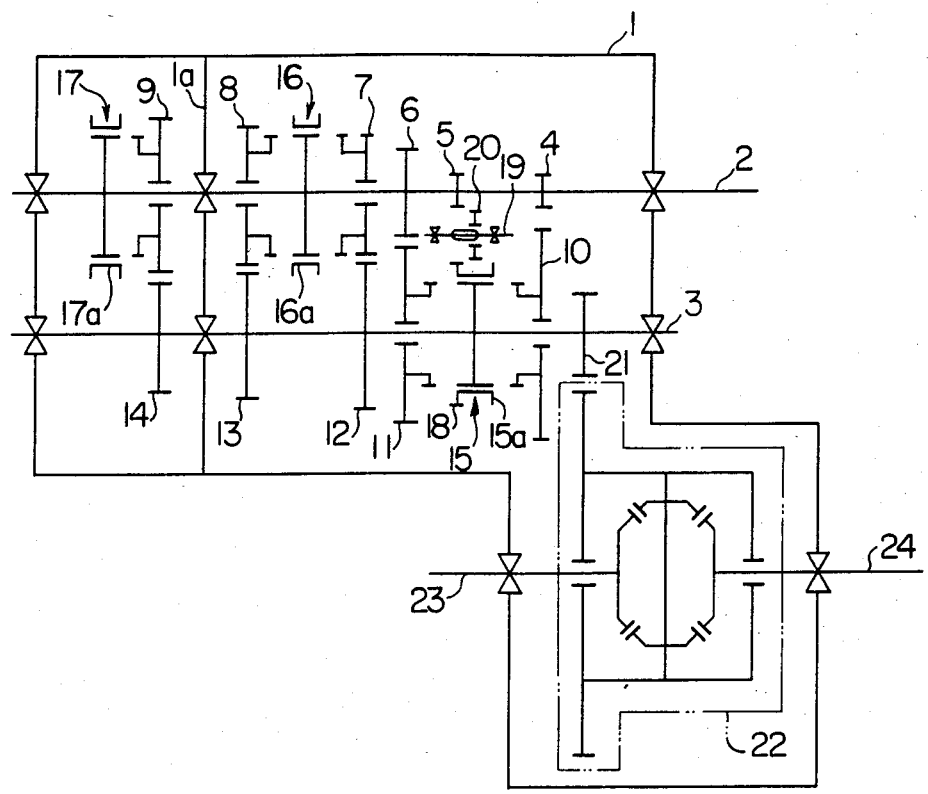
FIG. 1 is a schematic diagram of a manual transmission.

A preferred embodiment of the invention will be described hereinunder with specific reference to the attached drawings. First of all, a manual transmission having five forward speed gears and one reverse gear to which the invention pertains, will be explained with reference to the schematic diagram shown in FIG. 1. The transmission has a case 1 which rotatably carries an input shaft 2 and an output shaft 3 arranged in parallel with each other. First speed gear 4, reverse gear 5 and second speed gear 6 are fixed to the input shaft 2 in the mentioned order from the right side as viewed in the drawing. Third speed gear 7, fourth speed gear 8 and fifth speed gear 9 also are carried by the input shaft 2 but these gears are rotatably mounted on the input shaft 2. On the other hand, the output shaft 3 rotatably carries counter gears 10 and 11 normally meshing with the first speed gear 4 and the second speed gear 6, respectively, while counter gears 12 to 14 normally meshing with the third to fifth speed gears 7 to 9 are fixed to the output shaft 3. The counter first gear 10 and counter second gear 11 are adapted to rotate as a unit with the output shaft 3 as a driving connection therebetween is achieved by the sleeve 15a of a first clutch mechanism 15 while the third speed gear 7 and fourth speed gear 8 are adapted to rotate as a unit with the input shaft 2 as a driving connection therebetween is achieved by the sleeve 16a of a second clutch mechanism 16. Also, the fifth speed gear 9 is adapted to be rotated as a unit with the input shaft 2 as a driving connection therebetween is achieved by the sleeve 17a of the third clutch mechanism 17. Through this transmission, rotation of the input shaft 2, which is driven by the engine (not shown) through the clutch, is transmitted to the output shaft 3 at the selected speed reduction ratio. A counter reverse gear 18 is provided on the outer peripheral of the sleeve 15a of the clutch mechanism 15. A reverse idler shaft 19 rotatably mounted on the case 1 carries a reverse idler gear 20 axially movably and corotatably, i.e., for a rotation as unit with, the reverse idler shaft 19. With this arrangement, as this idler gear 20 meshes with the reverse gear 5 and the counter reverse gear 18 simultaneously, rotation of the input shaft 2 is transmitted to the output shaft 3 in the reverse direction. Rotation of the output shaft 3 is transmitted first to a differential gear 22 through the drive gear 21 on the output shaft and then to the left and right drive shafts 23 and 24. In FIG. 1, the transmission is shown in the neutral position in which rotation of the input shaft 2 is not transmitted to the output shaft 3.

A description will be made hereinunder as to the transmission manipulation device by which the speed changing operation is effected through movement of the clutch sleeves 15a to 17a of the clutch mechanisms 15 to 17, with specific reference to FIGS. 2 to 5.

Figure 2:
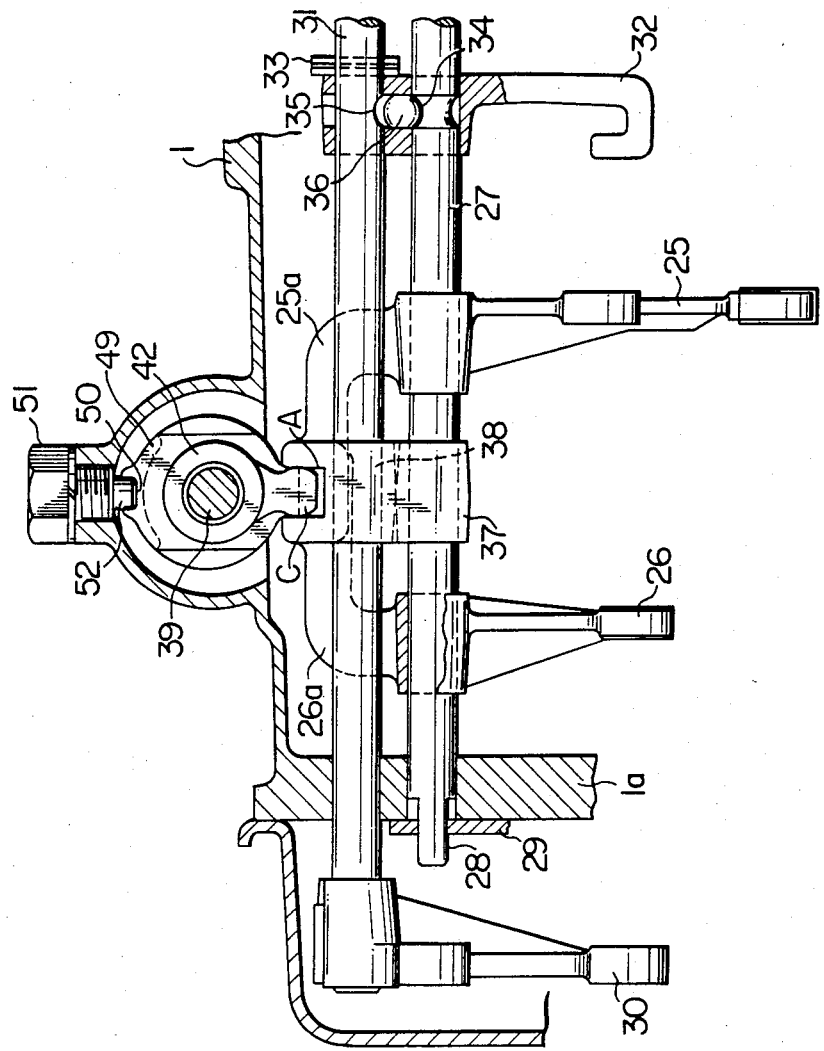
FIG. 2 is a front elevational sectional view of a transmission manipulation device.
Figure 3:
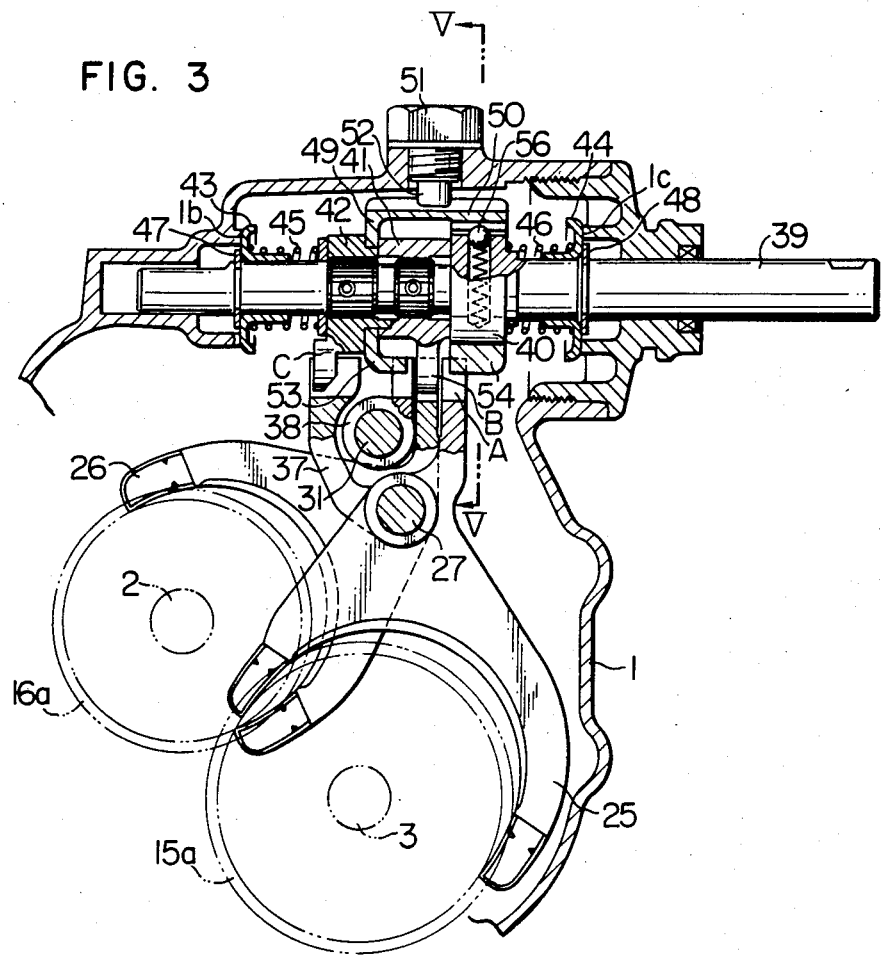
FIG. 3 is a sectional side elevational view of the transmission manipulation device.
Figure 5:
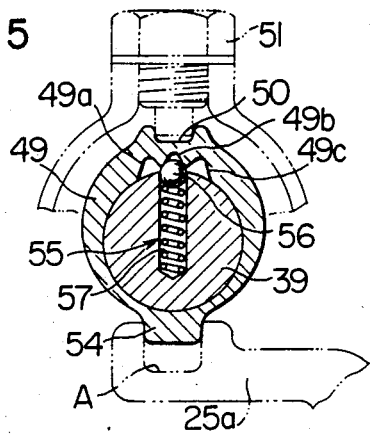
FIG. 5 is a sectional view taken along the line V—V of FIG. 3.

As shown in FIGS. 2 and 3, shift forks 25 and 26 are adapted to be engageable with the sleeves 15a and 16a of the first and second clutch mechanisms 15 and 16, respectively, in a manner to permit these sleeves 15a and 16a to rotate and move in the axial direction. The first shift fork 25 and second shift fork 26 are mounted axially movably to a first fork shaft 27 which in turn is mounted on the case 1 axially movably and in parallel with the input shaft 2. The left end of the fork shaft 27 as viewed in FIG. 2 is provided with two flat surfaces 28 and is prevented by means of the retainer 29 secured to an intermediate wall 1a of the casing 1 from rotation. Also, a third shift fork 30 engages with the sleeve 17a of the third clutch mechanism 3 in a manner to permit the same to rotate and move axially. The shift fork 30 is fixed to the second fork shaft 31. The fork shaft 31 is axially movably mounted on the case 1 to extend through the intermediate wall 1a of the case 1. The fork shaft 31 extends in parallel with the shaft 27 at the front upper side thereof (left upper side as viewed in FIG. 3). A reverse shift arm 32 is axially movably carried by the right ends of two fork shafts 27 and 31. The shift arm 32 is connected to the reverse idler gear 20 in a manner to permit the same to rotate and move axially. The shift arm 32 is restrained from moving to the right by means of a retaining pin 33 which is secured to the second fork shaft 31. The arm 32 is provided with a one-way pin 36 engageable with opposing engaging grooves 34 and 35 which are formed in this both fork shafts 27 and 31. With the arrangement, when the shift arm 32 is moved together with the fork shaft 31 upon the leftward movement thereof, the one-way pin 36 leaves the engaging groove 34 in the first fork shaft 27 which is held stationary, and moves upward into engagement with the engaging groove 35 of the second fork shaft 31. Therefore, when the second fork shaft 31 is returned, the shift arm 32 is moved together with the fork shaft 31. Upon the rightward movement of the second fork shaft 31 and upon the movement of the first fork 27 shaft to the left and right, the one-way pin 36 engages the engaging groove of the shaft which is held stationary, thereby to hold the reverse shift arm 32 stationary.

A first shift head 37 is fixed to the first fork shaft 27 between the first shift fork 25 and the second shift fork 26. A second shift head 38 is formed on the second shift fork 26 while a head portion 25a disposed rearwardly from the head portion 26a of the second shift fork 26 is provided on the first shift fork 25. The shift heads 37, 38 and head portions 25a, 26a are provided with engaging grooves A—A as shown in FIG. 4. When the transmission is in the neutral position the engaging grooves A—A are aligned on a line which intersects the fork shaft at a right angle.

Figure 4A:
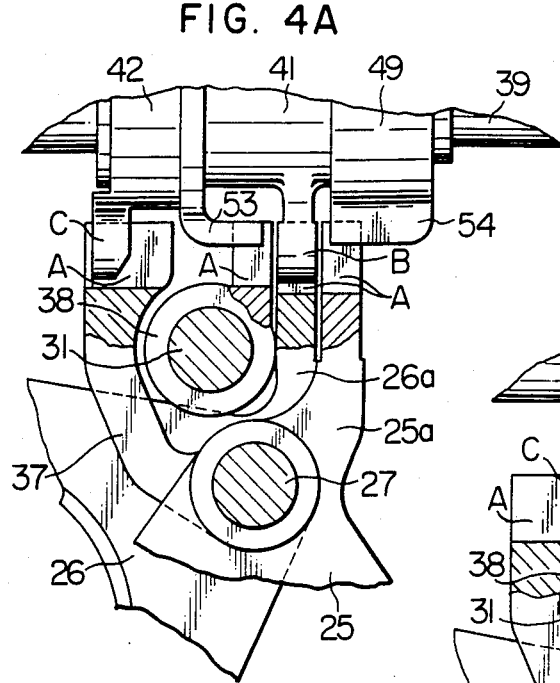
Figure 4B:
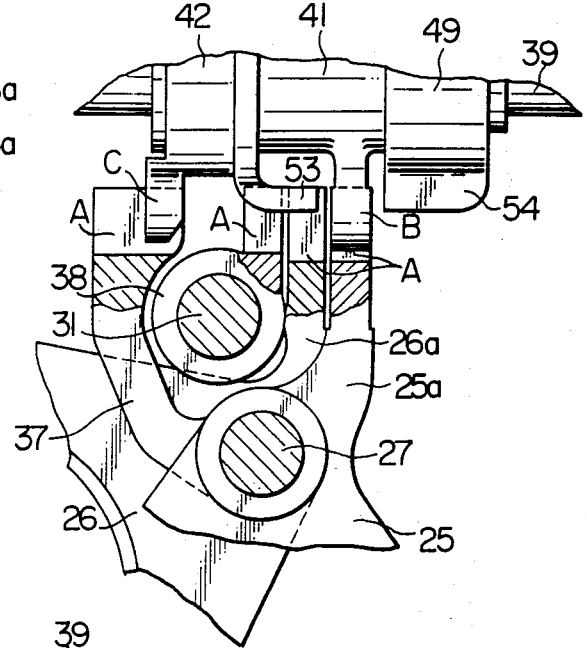

The case 1 carries rotatably and axially movably also a shift and select lever shaft 39 which extends above the fork shafts 27 and 31 transverse thereto. The lever shaft 39 is adapted to be moved in the axial direction by the selecting operation of the shift lever (not shown) through a remote mechanism, and to be rotated by the shifting operation of the shift lever through the remote mechanism. A large diameter portion 40 is formed on the central portion of the lever shaft 39. A first inner lever 41 and second inner lever 42 are fixed to the lever shaft 39 at the front side of the portion 40 in a side-by-side relation. Front and rear washers 43 and 44 are axially movably fitted on both ends of the lever shaft 39. Front and rear return springs 45 and 46 are disposed between the front washer 43 and the second inner lever 42 and between the rear washer 44 and the portion 40, respectively. The washers 43 and 44 are restrained from coming off from the lever shaft 39 by the front and rear snap springs 47 and 48 attached to both ends thereof. The washers 43 and 44, on the other hand, abut the front and rear walls 1b and 1c of the case 1, thereby to hold the lever shaft 39 in the neutral position. The first inner lever 41 is provided with a first projection B which extends downwardly and engages, when the lever shaft 39 is in the neutral position, with the engaging groove A in the second shift fork 26 as shown in FIG. 4A. A second projection C projects downwardly from the second inner lever 42. The projection C is allowed to engage with the engaging groove A of the first shift head 37 only when the first inner lever 41 is in engagement with the engaging groove A of the first shift fork 25 or the engaging groove A of the second shift fork 26, as shown in FIGS. 4A and 4B.

Figure 4C:
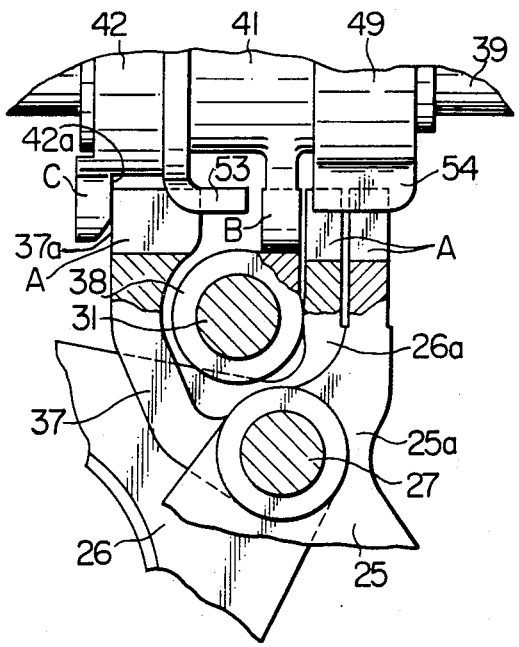

The interlocking construction in the transmission manipulation device having the described construction will be explained hereinunder. The lever shaft 39 has an interlock plate 49 which covers the first inner lever 41 and permits the lever shaft 39 to rotate. A groove 50 is formed in the upper surface of the interlock plate 49 to extend in the axial direction of the lever shaft 39. The groove 50 is adapted to be engaged by the end 52 of the lock bolt 51 which is screwed in the upper portion of the case 1, so as to prevent the rotation of the interlock plate 49. As seen from FIGS. 4A to 4C, front and rear retaining projections 53 and 54 are formed with the first projection B of the first inner lever 41 positioned therebetween. These retaining projections 53 and 54 are adapted to engage with the engaging grooves A—A which are not engaged by the first projection B of the inner lever 41 or by the second projection C of the inner lever 42. In other words, when the lever shaft 39 is in the neutral position, the retaining projections 53 and 54 serve to hold the second shift head 38 and the first shift fork 25 immovable, as shown in FIG. 4A. However, when the first inner lever 41 engages with the first shift fork 25, the retaining projections 53 and 54 hold the second shift fork 26 and the second shift head 38 immovable, as shown in FIG. 4B. Also, when the first inner lever 41 is in engagement with the second shift head 38, the retaining projections 53 and 54 hold the first shift head 37, first shift fork 25 and the second shift fork 26 immovable, as shown in FIG. 4C.

A latch mechanism 55 is provided on the shaft 39 at a portion thereof near the large diameter portion 40 with a ball 56 which is pressed into one of the three engaging grooves 49a to 49c in the inner peripheral surface of the interlock plate 49 by the biasing force of the spring 57, thereby to hold the lever shaft 39 in a selected rotational position. (see FIG. 5)

In the transmission manipulation device having the construction explained hereinbefore, the first speed position is attained in a manner explained hereinunder. When a selecting operation is effected by moving the shift and select lever shaft 39 rearwardly (rightward as viewed in FIG. 3) from the neutral position against the force of the return spring 46, the first projection B of the first inner lever 41 moves to the right and is brought into engagement with the engaging groove A of the first shift fork 25, so that the sleeve 15a of the first clutch mechanism 15 is connected to the counter first gear 10. Since the shifting operation is effected with the second projection C of the second inner lever 42 engaging the engaging groove A of the first shift head 37, the first shift fork 25 and first fork shaft 27 are moved as a unit as the lever shaft 39 is rotated. In this state, the second shift fork 26 and second shift head 38 are held stationary since the engaging grooves A,A thereof are engaged by the retaining projection 53 of the interlock plate 49 as shown in FIG. 4B, so that the second shift fork 26 is moved along the first fork shaft 27 relative thereto.

For attaining the second speed position, a shifting operation is effected by rotating the shaft 39 in the direction opposite to the direction of rotation in the first speed position. Thus, the first shift fork 25 is moved to the left and the sleeve 15a is connected to the counter second gear 11. In this case also, the first shift fork 25 moves as a unit with the fork shaft 27, as in the case of the first speed transmission, and the second shift fork 26 and second shift head 38 are held immovable by the retaining projection 53 of the interlock plate 49.

For attaining the third speed position, a shifting operation is effected by rotating the neutrally positioned shift and select lever shaft 39 counter-clockwise as viewed in FIG. 2. Thus the second shift fork 26 engaged by the first projection B of the first inner lever 41 is moved to the right, thereby to connect the sleeve 16a of the second clutch mechanism 16 to the third speed gear 7. Since the shifting operation is effected with the second projection C of the second inner lever 42 in engagement with the engaging groove A in the first shift head 37, the second shift fork 26 and first fork shaft 27 are moved as a unit upon the rotation of the lever shaft 39. In this state, the retaining projections 53 and 54 on the interlock plate 49 are held in engagement with the engaging grooves A,A in the first shift fork 25 and the second shift head 38 as shown in FIG. 4A, thereby to hold the shift fork 25 and the shift head 38 immovable. Thus, the first shift fork 25 slides along the first fork shaft 27 relative thereto.

For attaining the fourth speed position, a shifting operation is effected by rotating the lever shaft 39 in the direction opposite to that in the third speed position. Thus the second shift fork 26 is moved to the left to connect the sleeve 16a to the fourth speed gear 8. In this case also, the second shift fork 26 moves as a unit with the first shift fork 27 as in the case of the third speed position while the first shift fork 25 and second shift head 38 are held immovable by the retaining projection 53, 54 of the interlock plate 49.

For attaining the fifth speed position, a shifting operation is effected by moving the neutrally shift and select lever shaft 39 forwardly against the force of the return spring 45. Thus the first projection B of the first inner lever 41 is brought into engagement with the engage groove A of the second shift head 38. Then, as a shifting operation is effected by rotating the lever shaft 39 counter-clockwise as viewed in FIG. 2, the third shift fork 30 is moved to the right together with the second fork shaft 31, so that the sleeve 17a of the third clutch mechanism 17 is connected to the fifth gear 9. The first shift head 37, first shift fork 25 and second shift fork 26 are held immovable since the retaining projections 53 and 54 of the interlock plate 49 are held in engagement with the engaging grooves A—A thereof as shown in FIG. 4C. The reverse shift arm 32 also is held immovable since the one-way pin 36 is held in engagement with the engaging groove 34 of the first fork shaft 27 which is held stationary as a unit with the first shift head 37.

Needless to say, the neutral position of the transmission is resumed by reversing the procedure in each case.

For reverse, a shifting operation is effected by rotating the lever shaft 39 in the direction opposite to that in the fifth speed position. Thus the second fork shaft 31 is moved to the left and the reverse shift arm 32 is moved as a unit with the shaft 31 by the engaging pin 33, so that the reverse idler gear 20 is brought into engagement with the reverse gear 5 and the counter reverse gear 18 simultaneously. As in the case of the fifth speed position, the first shift head 37, first shift fork 25 and second shift fork 26 are held immovable by the projections 53, 54 of the interlock plate 49. For returning to the neutral position from the reverse position, the reverse shift arm 32 can be reset together with the second fork shaft 31 to resume the neutral position since the one-way pin 36 has been brought into engagement with the engaging groove 35 of the second fork shaft 31 in the course of the shifting operation for reverse.

As will be understood from the foregoing description, according to the invention, it is possible to hold immovable the shift forks and the fork shaft other than the shift fork and the fork shaft to be operated in the shifting operation during the selecting operation of the shift and select lever shaft, without adversely affecting the selecting stroke of the lever shaft and, hence, to obtain a reasonable interlocking operation.

Although the invention has been described through specific terms, it is to be noted here that the described embodiment is not exclusive and various changes and modifications thereof may be imparted thereto without departing from the scope of the invention, which is limited solely by the appended claims.

What is claimed is:

1. In a transmission having a transmission case, a first fork shaft and a second fork shaft axially movably and corotatably mounted on said transmission case, a plurality of shift forks axially movably and rotatably mounted on said first fork shaft, said shift forks having engaging portions aligned in a direction perpendicular to the fork shafts, a shift and select lever shaft axially movably and rotatably carried by said transmission case and extending in the direction perpendicular to said first and second fork shafts, a resilient member biasing said lever shaft towards a neutral position, a first projection provided on said lever shaft selectively engageable with the engaging portion of one of said shift forks, a first shift head fixed to said first fork shaft and having an engaging portion adjacent to said engaging portions of said shift forks, a second projection provided on said lever shaft engageable with the engaging portion of said first shift head only when said first projection is in engagement with the engaging portion of any one of said shift forks on said first fork shaft, a single shift fork fixed to said second fork shaft and having an engaging portion adjacent to said engaging portions of said shift forks attached to said first fork shaft, said first projection on said lever shaft being selectively engageable with the engaging portion of said second shift head, an interlocking construction comprising:

an interlocking plate rotatably provided on said lever shaft but prevented from rotating with respect to said case, said interlocking plate comprising front and rear projections engageable with the engaging portions of said shift forks on said first fork shaft which are not engaged by said first projection, as well as with the engaging portion of said second shift head, when said second projection is engaged by said engaging portion of said first shift head, and engageable with the engaging portions of all shift forks on said first fork shaft, as well as the engaging portion of said first shift head, when said second projection is not engaged with the first shift head.

2. The transmission of claim 1, wherein said front and rear projections are disposed on opposite sides of said first lever projection.

3. The transmission of claim 2, wherein said front and rear projections further are disposed adjacent to but spaced apart from said second lever projection.

* * * * *